(12) United States Patent
Wolff-Petersen et al.

(10) Patent No.: US 10,391,391 B2
(45) Date of Patent: *Aug. 27, 2019

(54) DEVICE FOR MANAGING OPERATIONS OF ACCESSORIES

(71) Applicant: STEELSERIES APS, Frederiksberg (DK)

(72) Inventors: Jacob Wolff-Petersen, Richmond (GB); Tino Soelberg, Valby (DK)

(73) Assignee: STEELSERIES APS, Frederiksberg (DK)

( * ) Notice: Subject to any disclaimer, the term of this patent is extended or adjusted under 35 U.S.C. 154(b) by 309 days.

This patent is subject to a terminal disclaimer.

(21) Appl. No.: 15/292,572

(22) Filed: Oct. 13, 2016

(65) Prior Publication Data
US 2017/0028296 A1 Feb. 2, 2017

Related U.S. Application Data

(63) Continuation of application No. 14/943,376, filed on Nov. 17, 2015, now Pat. No. 9,492,745, which is a
(Continued)

(51) Int. Cl.
*A63F 13/23* (2014.01)
*A63F 13/22* (2014.01)
(Continued)

(52) U.S. Cl.
CPC .............. *A63F 13/23* (2014.09); *A63F 13/10* (2013.01); *A63F 13/22* (2014.09); *A63F 13/25* (2014.09);
(Continued)

(58) Field of Classification Search
CPC ................................. G06F 3/017; A63F 9/24
See application file for complete search history.

(56) References Cited

U.S. PATENT DOCUMENTS

| 5,896,125 A | * | 4/1999 | Niedzwiecki | ........... A63F 13/02 345/156 |
|---|---|---|---|---|
| 2005/0239550 A1 | | 10/2005 | Hardisty et al. | |
| 2009/0048021 A1 | * | 2/2009 | Lian | ........................ A63F 13/06 463/37 |

OTHER PUBLICATIONS

Darwinremote, http://www.slipperybrick.com/2007/01/wii-remote-control-darwiinremote/. Published Jan. 3, 2007.
(Continued)

*Primary Examiner* — Reginald A Renwick
(74) *Attorney, Agent, or Firm* — Guntin & Gust, PLC; Andrew D. Raymond (57) ABSTRACT

A system that incorporates teachings of the present disclosure may include, for example, an apparatus having a processor to detect a gaming accessory stimulation associated with a programmable layer of a number of programmable layers. The processor identifies a substitute gaming accessory stimulation of the programmable layer of the number of programmable layers of the gaming accessory. The substitute gaming accessory stimulation of the programmable layer is associated with the gaming accessory stimulation of the programmable layer of the number of programmable layers, according to a user profile of a number of user profiles associated with a user account. Other predetermined associations of stimulations of the gaming accessory with other substitute accessory stimulations are recorded in other user profiles of the number of user profiles, and the substitute gaming accessory stimulation is provided to a computing device to manage a gaming software application. Additional embodiments are disclosed.

20 Claims, 10 Drawing Sheets

Related U.S. Application Data continuation of application No. 14/555,064, filed on Nov. 26, 2014, now Pat. No. 9,216,355, which is a continuation of application No. 12/509,509, filed on Jul. 27, 2009, now Pat. No. 8,956,234.

(51) Int. Cl.
| | |
|---|---|
| A63F 13/40 | (2014.01) |
| G06F 3/023 | (2006.01) |
| G06F 3/038 | (2013.01) |
| A63F 13/85 | (2014.01) |
| A63F 13/79 | (2014.01) |
| A63F 13/98 | (2014.01) |
| A63F 13/25 | (2014.01) |
| A63F 13/30 | (2014.01) |
| A63F 13/327 | (2014.01) |

(52) U.S. Cl.
CPC .............. *A63F 13/30* (2014.09); *A63F 13/79* (2014.09); *A63F 13/85* (2014.09); *A63F 13/98* (2014.09); *G06F 3/023* (2013.01); *G06F 3/0238* (2013.01); *G06F 3/038* (2013.01); *A63F 13/327* (2014.09); *A63F 2300/1018* (2013.01); *A63F 2300/209* (2013.01)

(56) References Cited

OTHER PUBLICATIONS

Glove PI E, http://www. aeropause. co m/2008/ 11 /how-to-use-your-wi i-re mote-and-its-peripherals-as-co ntro lie rs-on-your-computer I, Published Nov. 18, 2008.
http://www.microsoft.com/hardware/mouseandkeyboard/ProductDetails.aspx?pid=099.
http://www.usbgear.com/USB-Bluetooth.html, Jul. 21, 2009.
SetPoint, http:/lunitstep.net!blog/2006/08/03/enabling-all-options-on-logitech-mice-using-uberoptions-and-setpoint/. Published: Aug. 3, 2006.

* cited by examiner

FIG. 10
1000

DEVICE FOR MANAGING OPERATIONS OF ACCESSORIES

CROSS-REFERENCE TO RELATED APPLICATION(S)

This application is a continuation of and claims priority to U.S. patent application Ser. No. 14/943,376, filed Nov. 17, 2015 by Wolff-Petersen et al., which is in turn a continuation of U.S. patent application Ser. No. 14/555,064, filed Nov. 26, 2014 by Wolff-Petersen et al., issued as U.S. Pat. No. 9,216,355, which is in turn a continuation of U.S. patent application Ser. No. 12/509,509, filed Jul. 27, 2009 by Wolff-Petersen et al., entitled "Device for Managing Operations of Accessories," issued as U.S. Pat. No. 8,956,234, each of which are incorporated by reference herein in their entirety.

FIELD OF THE DISCLOSURE

The present disclosure relates generally to accessory management applications, and more specifically to a device for managing operations of accessories.

BACKGROUND

It is common today for gamers to utilize more than one gaming accessory. This is especially true of gamers who play Massively Multiplayer On-line (MMO) games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories.

A gamer can frequently use a combination of these accessories in one game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to users.

DETAILED DESCRIPTION

One embodiment of the present disclosure can entail an apparatus having a controller to record an association of at least one of a plurality of stimulations that can be generated by a gaming accessory with one or more substitute accessory stimulations, establish communications with a computing device communicatively coupled to a gaming software application, establish communications with the gaming accessory, receive from the gaming accessory a stimulation, detect a match between the association and the received stimulation, retrieve the one or more substitute accessory stimulations, and transmit the one or more substitute accessory stimulations to the gaming software application.

One embodiment of the present disclosure can entail a computer-readable storage medium operating in a portable apparatus that manages accessory stimulations supplied to a computing device by a gaming accessory. The storage medium can have computer instructions to receive from the gaming accessory a stimulation, retrieve one or more substitute accessory stimulations, and transmit the one or more substitute accessory stimulations to the computing device to manage operations of a gaming software application communicatively coupled to the computing device.

One embodiment of the present disclosure can entail receiving a stimulation from a gaming accessory, replacing the stimulation with one or more substitute accessory stimulations, and transmitting the one or more substitute accessory stimulations to a computing device to manage a gaming software application communicatively coupled to the computing device.

One embodiment of the present disclosure can entail a gaming accessory having a controller to detect a selection of an input function, and transmit a stimulus to an apparatus that transmits one or more substitute accessory stimulations to a computer system or gaming console for controlling operations of a gaming software application.

One embodiment of the present disclosure can entail a computing device having a controller to receive from an apparatus one or more substitute accessory stimulations to control operations of a gaming software application. The apparatus is can be operable to receive a stimulation from a gaming accessory, replace the stimulation with the one or more substitute stimulations, and transmit the one or more substitute stimulations to the computing device.

One embodiment of the present disclosure can entail receiving a stimulation from an accessory, replacing the stimulation with one or more substitute accessory stimulations, and transmitting the one or more substitute accessory stimulations to a computing device to manage operation of a software application communicatively coupled to the computing device.

Figure 1:
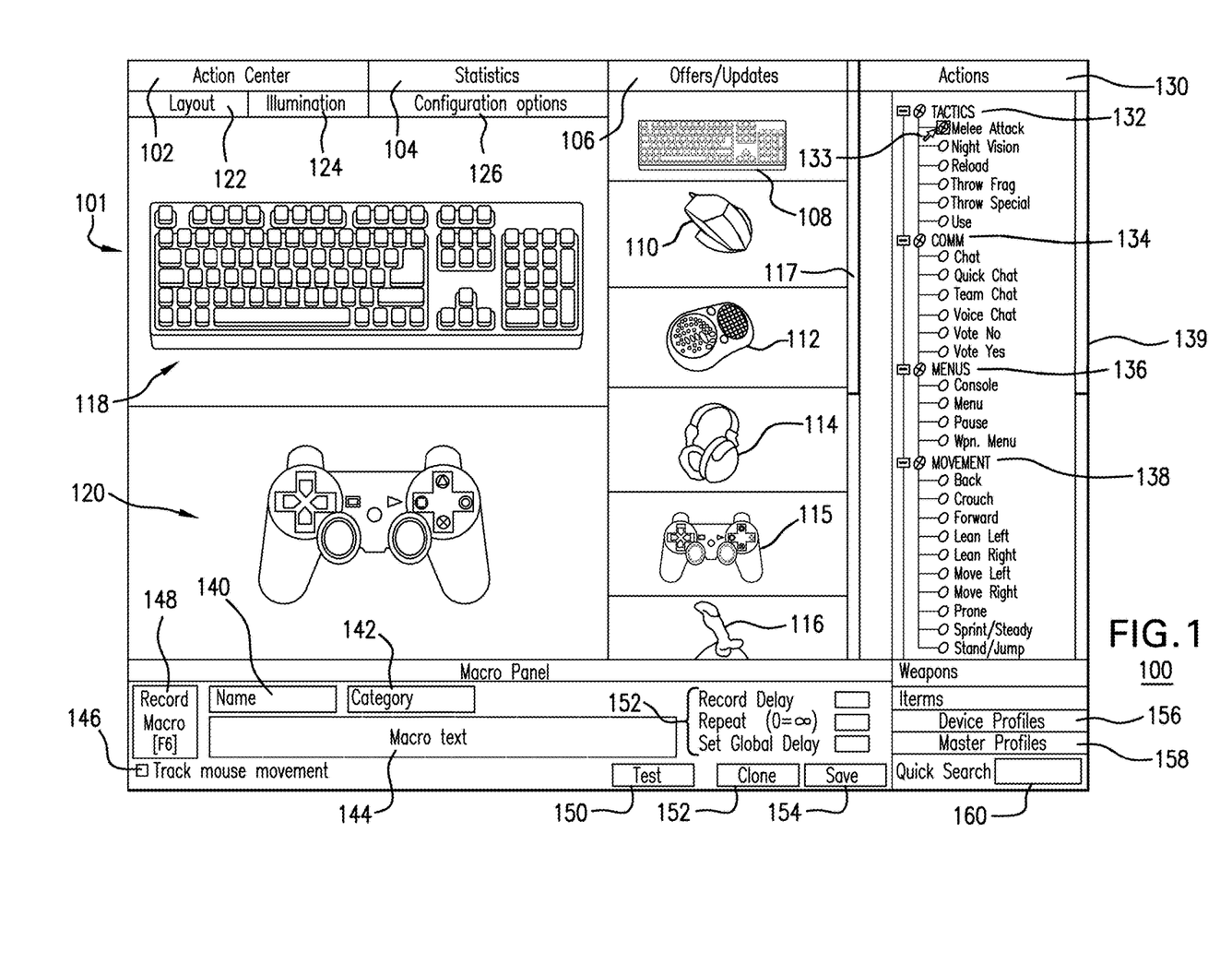
FIG. 1 depicts an illustrative embodiment of a Graphical User Interface (GUI) generated by an Accessory Management Software (AMS) application according to the present disclosure.
Figure 5:
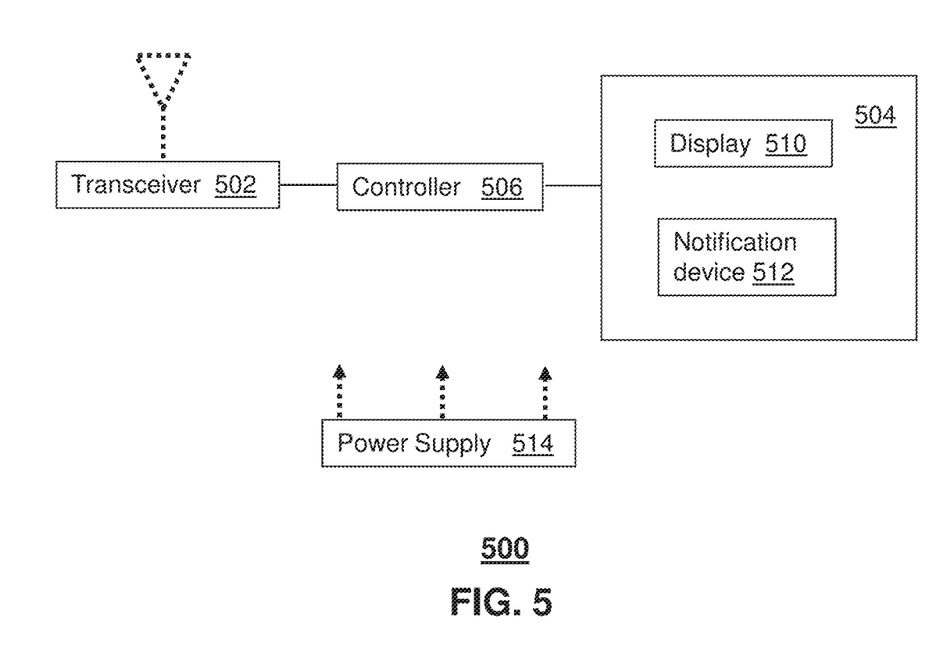
FIG. 5 depicts an illustrative embodiment of a block diagram of the apparatus.
Figure 6:
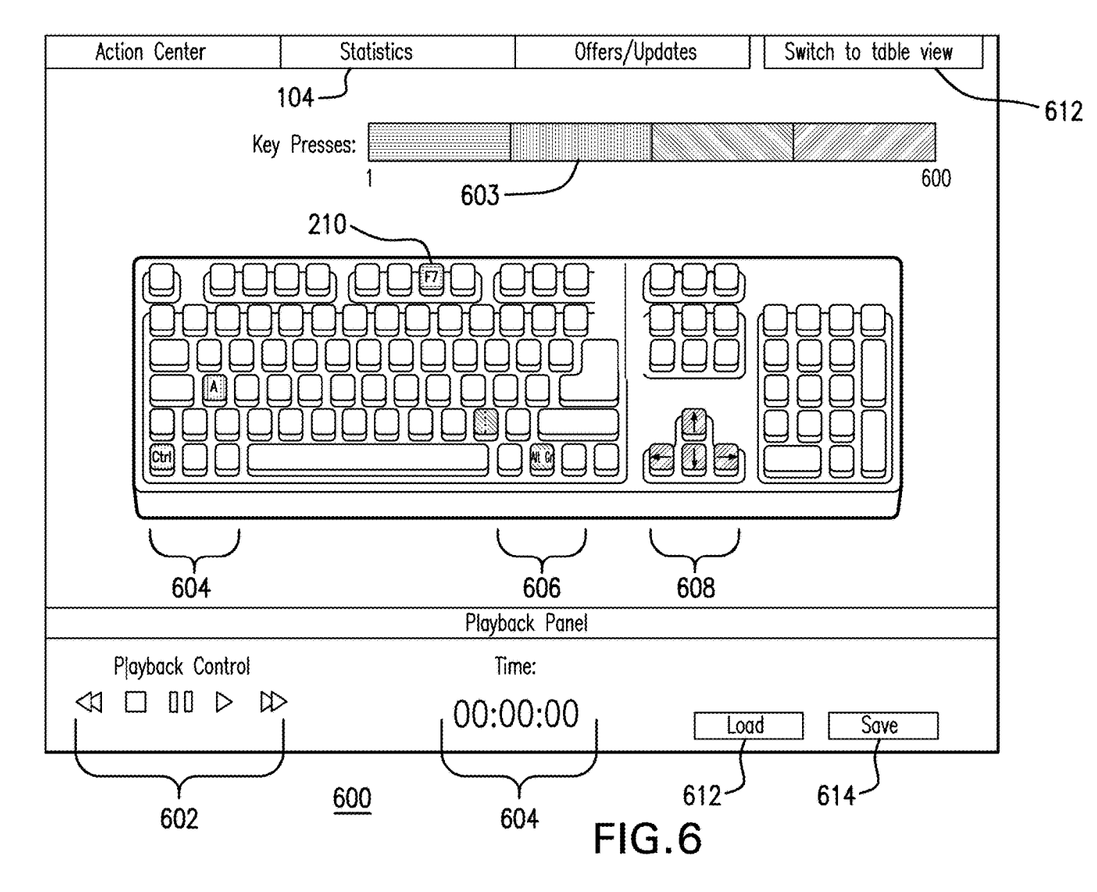
FIGS. 6-7 depict illustrative embodiments of the GUI of FIG. 1.

FIGS. 1, 5 and 6 depict illustrative embodiments of a Graphical User Interface (GUI) generated by an Accessory Management Software (AMS) application according to the present disclosure. The AMS application can operate in a computing device such as a desktop computer, a laptop computer, a server, a mainframe computer, or a gaming console. The AMS application can also operate in other computing devices with less computing resources such as a cellular phone, a personal digital assistant, or a media player (such as an iPOD™). From these illustrations it would be apparent to an artisan with ordinary skill in the art that the AMS application can operate in any device with computing resources.

Figure 2:
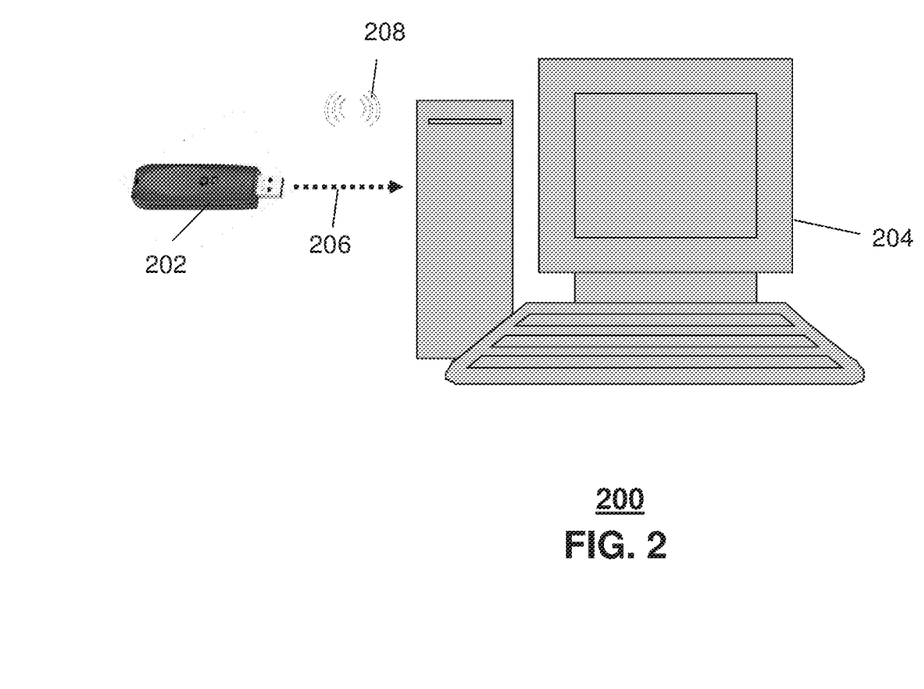
FIG. 2 depicts an embodiment for programming an apparatus with the AMS application.
Figure 3:
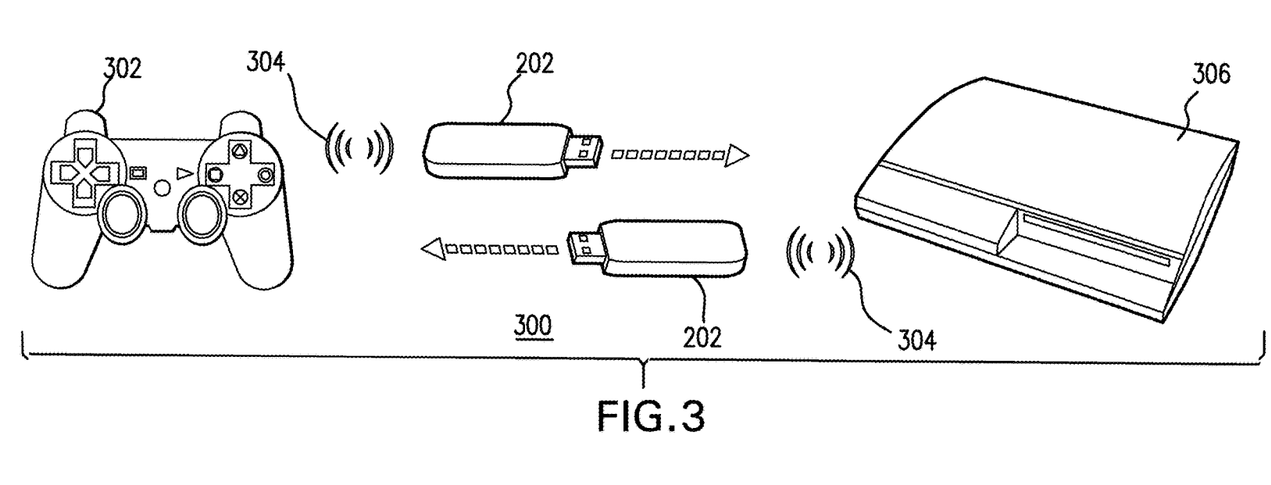
FIGS. 3-4 depict illustrative embodiments for utilizing the apparatus.
Figure 4:
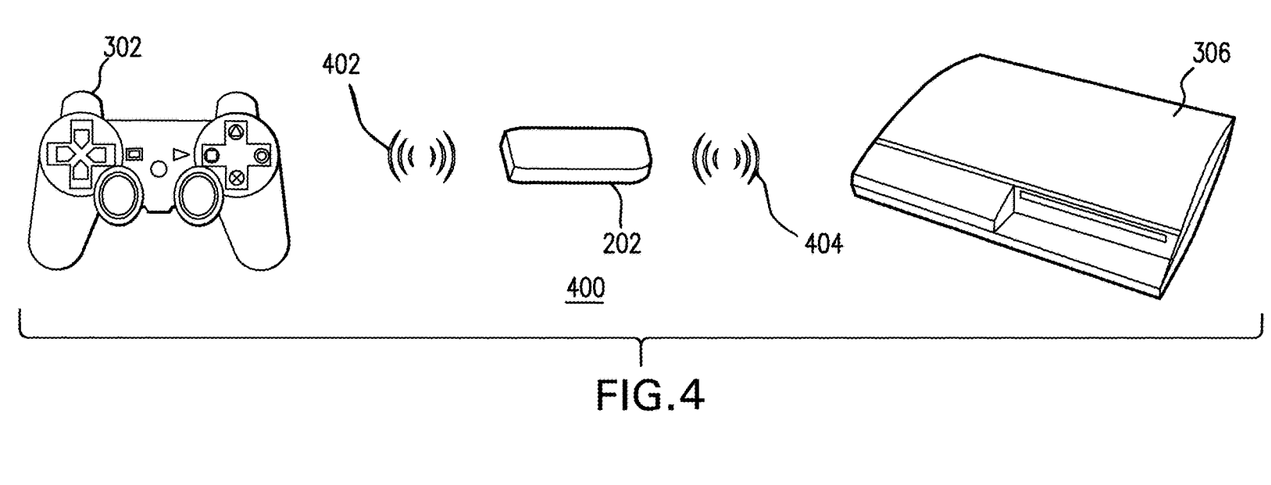

FIGS. 2-4 depict a portable apparatus 202 programmable by the AMS application. FIG. 2 depicts an illustration of how the portable apparatus 202 can be programmed. In this illustration, the portable apparatus can take the form of a Universal Serial Bus (USB) dongle (herein referred to as dongle 202). The dongle 202 can be communicatively coupled to a computer 204 by a physical interface 206 such as a USB port or wireless interface 208 such as Bluetooth or Wireless Fidelity (WiFi). The computer 204 can be used to execute operations of the AMS application. In this configuration, the AMS application can be directed to generate associations between accessory stimuli and input functions of accessories which can be programmed in the dongle 202 as will be described below.

FIGS. 3-4 illustrate a number of embodiments for utilizing the dongle 202 with a gaming accessory 302 and a computing device 306 such as a gaming console (herein referred to as gaming console 306). In the illustration of FIG. 3, the USB portion of the dongle 202 can be physically engaged with either the gaming accessory 302 or the gaming console 306. The dongle 202 in either of these configurations can communicate with the gaming accessory 302 or the gaming console 306 by wireless means 304 (e.g., WiFi or Bluetooth). In FIG. 4, the dongle 202 communicates with the gaming accessory 302 and the gaming console 304 by first and second wireless means 402, 404 (e.g., Bluetooth, WiFi) which can be different or the same. Other embodiments of the apparatus 202 are contemplated. For instance, the functions in whole or in part of the apparatus 202 can be an integral part of the gaming accessory 302 and/or the gaming console 304.

FIG. 5 depicts an illustrative embodiment of a block diagram 500 of the apparatus 202. The apparatus 202 can comprise a transceiver 502, a user interface (UI) 504, a power supply 514, and a controller 506 for managing operations thereof. The transceiver 502 can support a wireline interface such as a version of a USB interface for physically engaging with computer 204. Other common wireline interfaces (such as Firewire and Ethernet) or proprietary wireline interfaces are contemplated by the present disclosure. The transceiver 502 can also be adapted to support wireless communications. In this latter embodiment, the transceiver 502 can utilize commonly available technology to support wireless access technologies such as Bluetooth or WiFi. Other common wireless interfaces such as Zigbee or proprietary wireless interfaces are contemplated by the present disclosure.

The UI 504 can include a display 510 such as monochrome or color LCD (Liquid Crystal Display), OLED (Organic Light Emitting Diode) or other suitable display technology for conveying images such as a menu for programming operational parameters of the apparatus 202. The UI 504 can also include a notification device 512. The notification device 512 can use common illumination technology such as an LED or OLED (shown as reference 116 in FIGS. 1-3) to inform a user of an operational state of the apparatus 202. The notification device 512 can be adapted to present two or more states of operation by way of light and/or color illumination. For example, the notification device 512 can indicate the apparatus 202 has been programmed, is in operation, is communicatively engaged with the gaming accessory 302 or gaming console 306, is receiving power, and so on, according to varying color illuminations.

The apparatus 202 can have a power supply 514 which utilizes common power management technologies such as replaceable and rechargeable batteries, supply regulation technologies, and charging system technologies for supplying energy to the components of the apparatus 202. Alternatively, the charging system can utilize external power sources such as DC power supplied over a physical interface such as a USB port. Other power supply technologies suitable to the present disclosure are contemplated.

The controller 506 can utilize computing technologies such as a microprocessor, and/or an Application Specific Integrated Circuit (ASIC) operably coupled to memory such a Flash, ROM, RAM, SRAM, DRAM or combinations thereof.

Other components not shown in FIG. 5 are contemplated by the present disclosure. For instance, the apparatus 202 can include a reset button (not shown). The reset button can be used to reset the controller 506 of the apparatus 202. In yet another embodiment, the apparatus 202 can also include a factory default setting button positioned below a small hole in a housing assembly of the apparatus 202 to force the apparatus 202 to re-establish factory settings. In this embodiment, a user can use a protruding object such as a pen or paper clip tip to reach into the hole and depress the default setting button.

It will be appreciated that the apparatus 202 as described herein can operate with more or less components described in FIG. 5. These variant embodiments are contemplated by the present disclosure.

Figure 8:
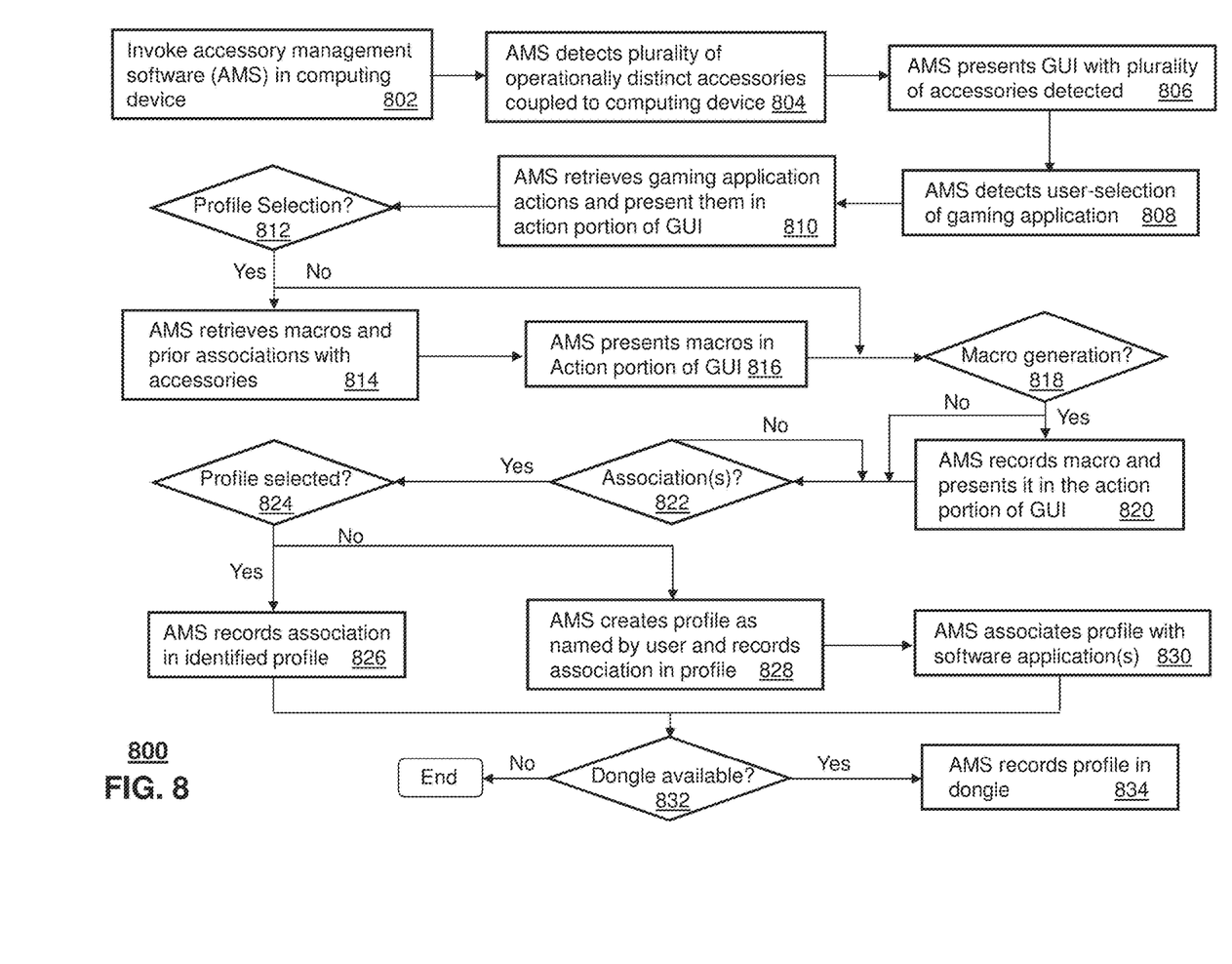
FIGS. 8-10 depict illustrative methods describing the operation of the AMS application and the apparatus.
Figure 9:
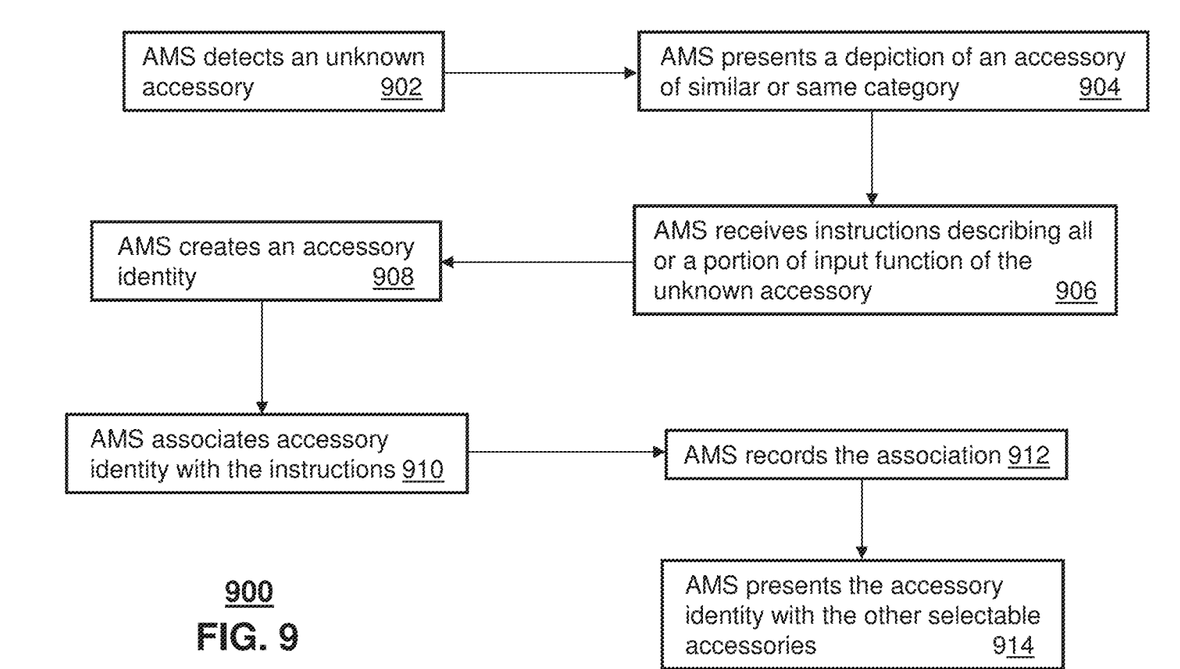
Figure 10:
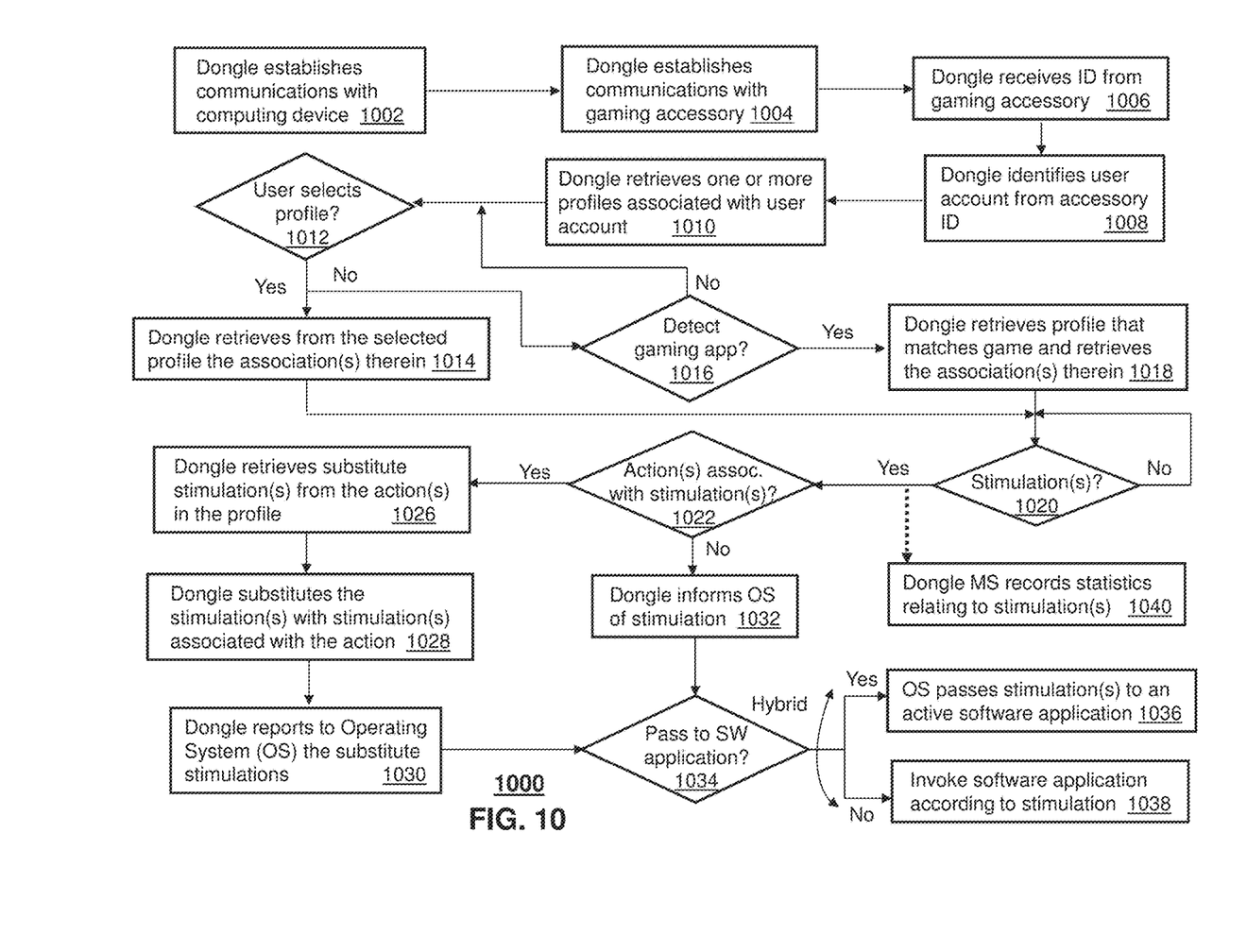

FIGS. 8-10 depict illustrative methods 800-1000 describing the operation of the AMS application and the apparatus 202. Method 800 can begin with step 802 in which the AMS application is invoked in a computing device. The invocation step can result from a user selection of the AMS application from a menu or iconic symbol presented on a desktop of the computing device by an operating system (OS) managing operations thereof. In step 804, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device and which can control aspects of the OS and/or a software application operating in the computing device. An accessory can represent for example a keyboard, a gaming pad, a mouse, a gaming console controller, a joystick, a microphone, or a headset with a microphone—just to mention a few. The keyboard and gaming pad represent accessories of a similar category since their operational parameters are alike.

A mouse, on the other hand, represents an accessory having disparate operational parameters from the keyboard or gaming pad. For instance, the operational parameters of a keyboard generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories.

In step 806, the AMS application presents a GUI 101 such as depicted in FIG. 1 with operationally distinct accessories such as the keyboard 108 and mouse 110. The GUI 101 presents the accessories 108-116 in a scrollable section 117. One or more accessories can be selected by a user with a common mouse pointer. In this illustration, the keyboard 108 and gaming controller 115 were selected with a mouse pointer for customization. Upon selecting the keyboard 108 and mouse 110 in section 117, the AMS application presents the keyboard 108 and mouse 110 in split windows 118, 120, respectively, to help the user during the customization process.

In step 808, the AMS application can be programmed to detect a user-selection of a particular software application such as a game. This step can be the result of the user entering in a Quick Search field 160 the name of a gaming application (e.g., World of Warcraft™). Upon identifying a gaming application, the AMS application can retrieve in step 810 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories by way of a simple drag and drop action. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or gaming controller 115 to make an association with an input function of one of these accessories.

For example, the user can drag the Melee Attack symbol to the "O" button of the gaming controller 115 thereby causing an association between the selection of the "O" button and the gaming action of a Melee Attack. When the "O" button of the gaming controller 115 is selected during normal operation, the AMS application can detect the selection as a "trigger" to generate the key sequence "Ctrl A" which is understood by the gaming application as a request for a Melee Attack. The gaming application receives from the dongle 202 by way of an operating system in the gaming console 306 the "Ctrl A" sequence as if it had been generated by a QWERTY keyboard.

With this in mind, attention is directed to step 812 where the AMS application can respond to a user selection of a profile. A profile can be a device profile or master profile invoked by selecting GUI button 156 or 158, each of which can identify the association of actions with input functions of one or more accessories. If a profile selection is detected in step 812, the AMS application can retrieve in step 814 macro(s) and/or prior associations of actions with the accessories as defined by the profile. The actions and/or macros defined in the profile can also be presented in step 816 by the AMS application in the actions column 130 of the GUI 101 to modify or create new associations.

In step 818, the AMS application can also respond to a user selection to create a macro. A macro in the present context can mean any actionable command which can be recorded by the AMS application. An actionable command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a mouse or joystick, recordable selections of buttons on a keyboard, a mouse, or a mouse pad, and so on. Macros can also be combinations of the above illustrations. Macros can created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, etc.) and/or by manual entry in field 144 (e.g., typing the name and location of a software application to be initiated by an OS). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to customize such timing. Once the macro has been fully defined, selection of button 154 records the macro in step 820. The recording step can be combined with a step for adding the macro to the associable items Actions column 130, thereby providing the user the means to associate the macro with input functions of the accessories.

In step 822, the AMS application can respond to drag and drop associations between actions and input functions of the keyboard 108 and the gaming controller 115. If an association is detected, the AMS application can proceed to step 824 where it can determine if a profile has been identified in step 812 to record the association(s) detected. If a profile has been identified, the associations are recorded in said profile in step 826. If a profile has not been identified in step 812, the AMS application can create a profile in step 828 for recording the detected associations. In the same step, the user can name the newly created profile as desired. The newly created profile can also be associated with one or more software applications in step 830 for future reference.

Once the association has been recorded in a profile, the AMS application can determine in step 832 whether the dongle 202 shown illustratively in FIGS. 2-4 is available for programming. If the AMS application detects that the dongle 202 is communicatively coupled to the computer 204, the AMS application can proceed to step 834 of FIG. 8 where it submits the profile and its contents to the dongle 204 for recording.

The GUI 101 presented by the AMS application can have other functions. For example, the GUI 101 can provide options for layout of the accessory selected (button 122), how the keyboard is illuminated when associations between input functions and actions are made (button 134), and configuration options for the accessory (button 126). The AMS application can adapt the GUI 101 to present more than one functional perspective. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from raw stimulation information captured by the dongle 202 as will be described below.

Selecting button 106 can also cause the AMS application to adapt the GUI 101 to present promotional offers and software updates.

It should be noted that the steps of method 800 in whole or in part can be repeated until a desirable pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 9 depicts a method 900 in which the AMS application can be programmed to recognize unknown accessories so that method 800 can be applied to new accessories. Method 900 can begin with step 902 in which the AMS application detects an unknown accessory such as a new keyboard from an unknown vendor by way of a communicative coupling to a computing device from which the AMS application operates. The AMS application in this instance can receive an identity from the keyboard or the operating system which is not known the AMS application. Upon detecting an unknown accessory, the AMS application in step 904 can present a depiction of an accessory of similar or same category in response to a user providing direction as to the type of accessory (by selecting for example a dropdown menu). Alternatively, or in combination with the user instructions, the AMS application can determine from the information received from the unknown accessory an accessory type.

In step 906 the AMS application can receive instructions describing all or a portion of the input functions of the unknown accessory. These instructions can come from a user who defines each input function individually or responds to inquiries provided by the AMS application. The AMS application can for example make an assumption as to the keyboard layout and highlight each key with a proposed function which the user can verify or modify. Once the AMS application has been provided instructions in step 906, the AMS application can create an accessory identity in step 908 which can be defined by the user. In steps 910 and 912, the AMS application can associate and record the accessory instructions with the identity for future recognition of the accessory. In step 914, the AMS application can present a depiction of the new accessory with its identity along with the other selectable accessories in section 117.

Method 900 can provide a means for universal detection and identification of any accessory which can be used to control or manage software applications operating in a computing device.

FIG. 10 depicts a method 1000 for illustrating the operations of the dongle 202 for either of the configuration shown in FIGS. 3-4. Method 1000 can begin with the dongle 202 establishing communications in steps 1002 and 1004 with a computing device such the gaming console 306 of FIGS. 3-4 and a gaming accessory such as reference 302. These steps can represent for example a user of the dongle 202 inserting the dongle 202 into a USB port of the gaming console 306. Once the dongle 202 is inserted in the gaming console 306 it receives power from the gaming console 306, and establishes communications therewith. The dongle 202 can also detect over a wireless medium (e.g., Bluetooth) that a gaming accessory 302 has been detected. In step 1006, the gaming accessory 302 can in turn provide the dongle 202 an accessory ID. With the accessory ID, the dongle 202 can identify in step 1008 a user account associated with the gaming accessory 302. In step 1010, the dongle 202 can retrieve one or more profiles associated with the user account.

In step 1012, the user can be presented by way of a display coupled to the gaming console 302 the profiles available to the user to choose. If the user makes a selection, the dongle 202 proceeds to step 1014 where it retrieves from the selected profiles the association(s) stored therein. If a selection is not made, the dongle can proceed to step 1016 where it can determine from the gaming console 306 if it is actively communicating with a software gaming application operating in the gaming console 306 or operating in a remote system communicatively coupled thereto (e.g., on-line gaming application). If a gaming software application is detected, the dongle 202 proceeds to step 1018 where it retrieves the profile that matches the gaming application detected and the association(s) contained therein. In the present context, association(s) can represent accessory stimulations, navigation, speech, initiation of other application, or macros thereof. The accessory stimulations can be stimulations that can be generated by the gaming accessory 302 being used, stimulations from other unrelated accessories (e.g., a keyboard), or combinations thereof.

Once a profile and its contents have been retrieved in either of steps 1014 or step 1018, the dongle can proceed to step 1020 where it monitors stimulations generated by the gaming accessory 302. The stimulations can be generated by the user by tactile use of the controls of the gaming accessory 302. If a simulation is detected, the dongle 202 can determine in step 1022 whether to pass the detected stimulation(s) to an Operating System (OS) of the gaming console 306 without alteration in step 1032 or with substitutions in steps 1026-1030.

This determination can be made by comparing the detected stimulation(s) to triggers associated with one or more actions in the profile. If the detected stimulation(s) match the stimulations identified as triggers, then the dongle 202 proceeds to step 1026 where it retrieves substitute stimulation(s) from the triggered action(s) in the profile. In step 1028, the dongle 202 substitutes the detected stimulation(s) with the substitute stimulations and reports them to the OS of the gaming console 306. If there is no matches detected in step 1022, the dongle 202 transmits in step 1032 the detected stimulation to the OS of the gaming console 306 without alteration. In step 1034, the OS determines whether to pass the reported stimulations to the gaming software application in step 1036, invoke a software application identified in the stimulation(s) reported in steps 1030 or 1032, or a combination thereof.

Contemporaneous to the embodiments described above, the dongle 202 can record in step 1040 statistics or raw data relating to the detected accessory stimulations. A portion of the dongle 202 application can operate as a background process which records statistics and/or raw data relating to the stimulations detected. During or after a gaming session, a user can direct the dongle 202 to supply the AMS application the recorded data. This transfer can take place by reengaging the dongle 202 with the computer 204 physically or over an air interface such as WiFi.

Once the transfer of recorded data is made, the user can select button 104 in FIG. 1, which causes the AMS application to present an updated GUI such as shown in FIG. 6 which illustrates the usage of input functions of one or more accessories for which stimulations were detected in step 1020 of FIG. 10. For ease of illustration, assume the gaming accessory 302 of FIGS. 3-4 was a keyboard accessory instead of a gaming controller 302.

In the illustration of FIG. 6, certain keys (references 604, 606 608, 610) on the keyboard can be color-coded to illustrate the frequency of usage of these keys. A color scale 603 defines the frequency of usage of the input functions of the keyboard. The first end of the scale (navy blue) represents a single detected depression, while an opposite end of the scale (bright red) represents 500 detected depressions. Based on this scale, the AMS application maps by color in step 624 stimulations of the keyboard. For example, the key grouping 608 depict a color coding with the highest detectable usage, while the F7 key (reference 610) indicates the fewest depressions. Keys having zero depressions are not color coded to readily identify the color mapping of keys which were used at least once.

The AMS application provides additional functions in a playback panel of the GUI which can help a user understand how the color coded keys were used during an active software application such as a video game. In this section of the GUI, the AMS application can present the user with a playback control function 602 which the user can select to replay, pause, forward or rewind the usage of these keys. When usage playback is selected, the user can for instance see the color coded keys highlighted in real-time with a temporary white border to visualize how the keys were selected. A time clock 204 provides the user the elapsed time of the playback sequence. Button 612 allows the user to retrieve statistics from other sessions, while button 614 provides the user a means to save statistics from a given session.

The GUI of FIG. 6 could have been shown as a split screen with all accessories which generated one or more detected stimulations (e.g., keyboard, mouse, and microphone), each providing statistical symbolic results as described above for the keyboard. Although not shown, split screen embodiments are contemplated by the present disclosure for the GUI of FIG. 6.

Figure 7:
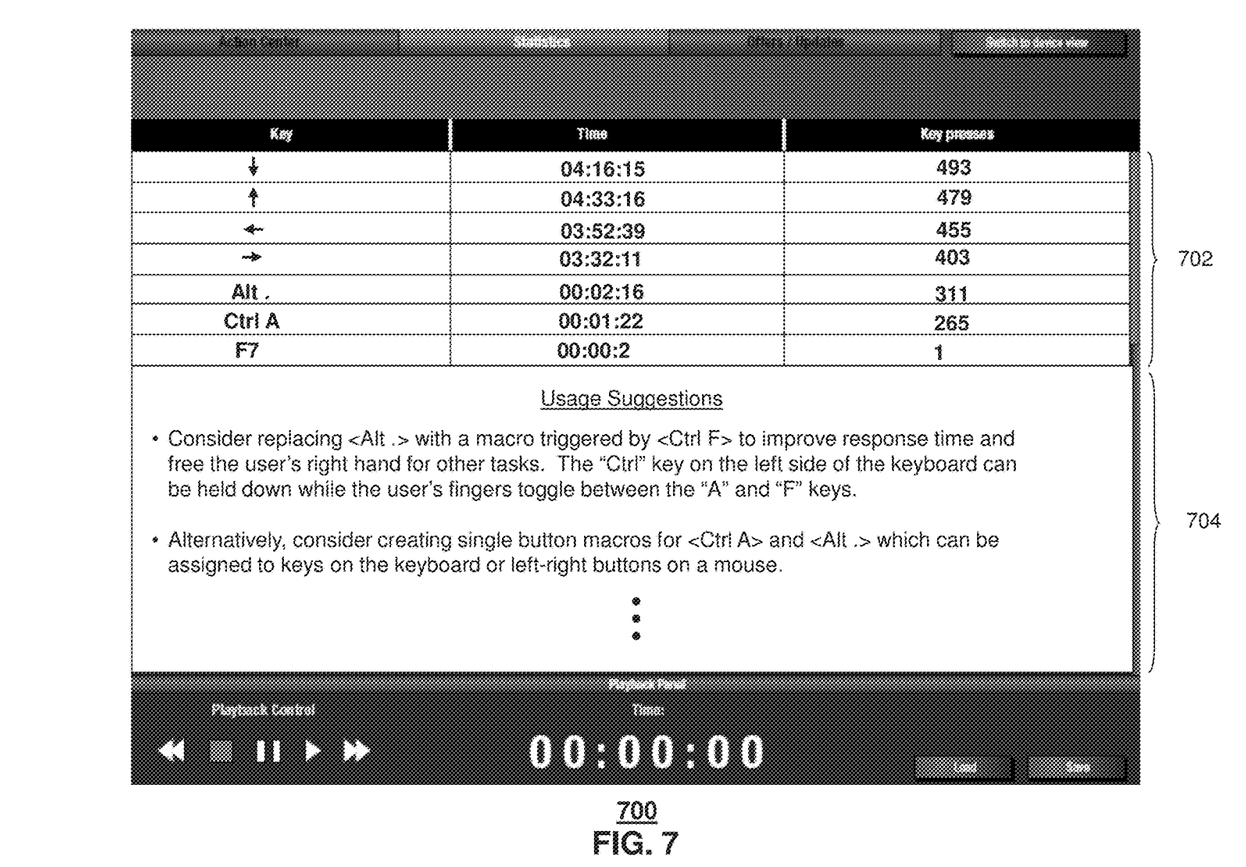

In addition to a symbolic representation as shown in FIG. 6, the AMS application can provide the user a means to visualize raw statistics in a table format such as shown in FIG. 7 by selecting button 612. The table format shows raw data in section 702 and possible suggestions in section 704 for improving user performance which can be generated by the AMS application. Section 702 can be presented in a table format with a column identifying the key being analyzed, its usage, and number of key presses. The user can ascertain from this table the most and least frequently used keys as well as other identifiable patterns.

The AMS application can utilize an understanding of the layout of the accessory (in this case, the keyboard) to determine from the statistics ways that the user can improve response time or ergonomic use. For example, the AMS application can determine from a layout analysis that the key combination <Alt .> can be reassigned to a macro based on the trigger <Ctrl F> which could provide the user a faster response time and free up the user's right hand for other tasks. The AMS application can also provide alternative suggestions. For example, the AMS application can also suggest creating single button macros for each of the key combinations <Alt .> and <Ctrl A> which can be assigned to keys on the keyboard or left and right buttons of a mouse. The latter suggestion of assigning macros to the mouse can help the user free up his/her left hand.

The AMS application can utilize present and next generation algorithms to determine how to improve response times and ergonomic usage of accessory devices. The AMS application can for example have at its disposal an understanding of the layout of each accessory, the type of software being controlled by the accessory (e.g., World of Warcraft), type of operations commonly used to control the software (e.g., known actions as shown in the actions column 130 of FIG. 1), an understanding of the associations made by other users (e.g., gamers) to improve their performance when controlling the software, and so on. The AMS application can also be adapted to communicate with the active software application by way of an Application Programming Interface (API) to receive additional usage statistics from the software which it can in turn use to improve the user's performance. The AMS application can also utilize common statistical and behavior modeling techniques to predict the behavior of the user and responses from the software application to identify possible ways to improve the user's performance.

From these illustrations, it would be apparent to an artisan of ordinary skill in the art that innumerable algorithms can be developed to analyze accessory usage and thereby suggest improvements. These undisclosed embodiments are contemplated by the present disclosure.

From the foregoing descriptions, it would be evident to an artisan with ordinary skill in the art that the aforementioned embodiments can be modified, reduced, or enhanced without departing from the scope and spirit of the claims described below. For example, the AMS application can be operated from other computing devices such as the gaming console 306. In this embodiment, the dongle 202 can provide the AMS application by way of the gaming console 306 the recorded statistics during or after a gaming session.

In another embodiment, the AMS application and dongle 202 can be adapted to define more than one programmable layer for an accessory. Such a feature can extend the functionality of an accessory into multi-layer paradigms of input functions. The GUI of FIG. 1 can be adapted so that a user can specify more than one programmable layer for a specific accessory. The user can also specify which layer to present in FIG. 1 while associating actions. If for instance layer 1 is shown, the GUI of FIG. 1 can present the actions associated in this layer by presenting descriptors superimposed on the input functions (e.g., buttons or keys). When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting the tab key on a Qwerty keyboard) to switch between layers in a round robin fashion (layer 1→layer 2→layer 3→to layer 1→ and so on). Alternatively, the user can define a hold and release trigger to switch between layers. In this embodiment, the user moves to another layer while pressing a button (e.g., a "Shift" key) and returns to the preceding layer upon its release. In yet another embodiment, the trigger to switch layers can be defined differently per layer. The user can for example select the letter "A" in layer 1 to proceed to layer 2, and select the letter "B" in layer 2 to return to layer 1 or proceed to yet another layer 3. There can be numerous combinations of layers and triggers which can be defined to substantially expand the capability of single accessory.

The foregoing multilayer paradigm can be programmed into the dongle 202 by the AMS application.

In another embodiment, the AMS application can be adapted so that a user can define super macros and/or super profiles. A super macro can represent nested macros (combinations of macros). AMS application can be adapted so that the user can customize the timing for executing nested macros. Similarly, a super profile can represent nested profiles (combinations of profiles). A super profile can for example comprise sub-profiles, each sub-profile defining associations of actions to input functions of a particular accessory. The super macros and/or profiles can be programmed into the dongle 202.

In yet another embodiment, the gaming accessory 302 can be equipped with a biometric device such as a fingerprint reader to identify the user of the gaming accessory 302 and thereby provide an identity that describes the user and the accessory used thereby. In this embodiment, different users can utilize the same gaming accessory but invoke in the dongle 202 a different user account depending on the biometric data provided with the accessory ID.

The foregoing embodiments are a subset of possible embodiments contemplated by the present disclosure. Other suitable modifications can be applied to the present disclosure. Accordingly, the reader is directed to the claims for a fuller understanding of the breadth and scope of the present disclosure.

Figure 11:
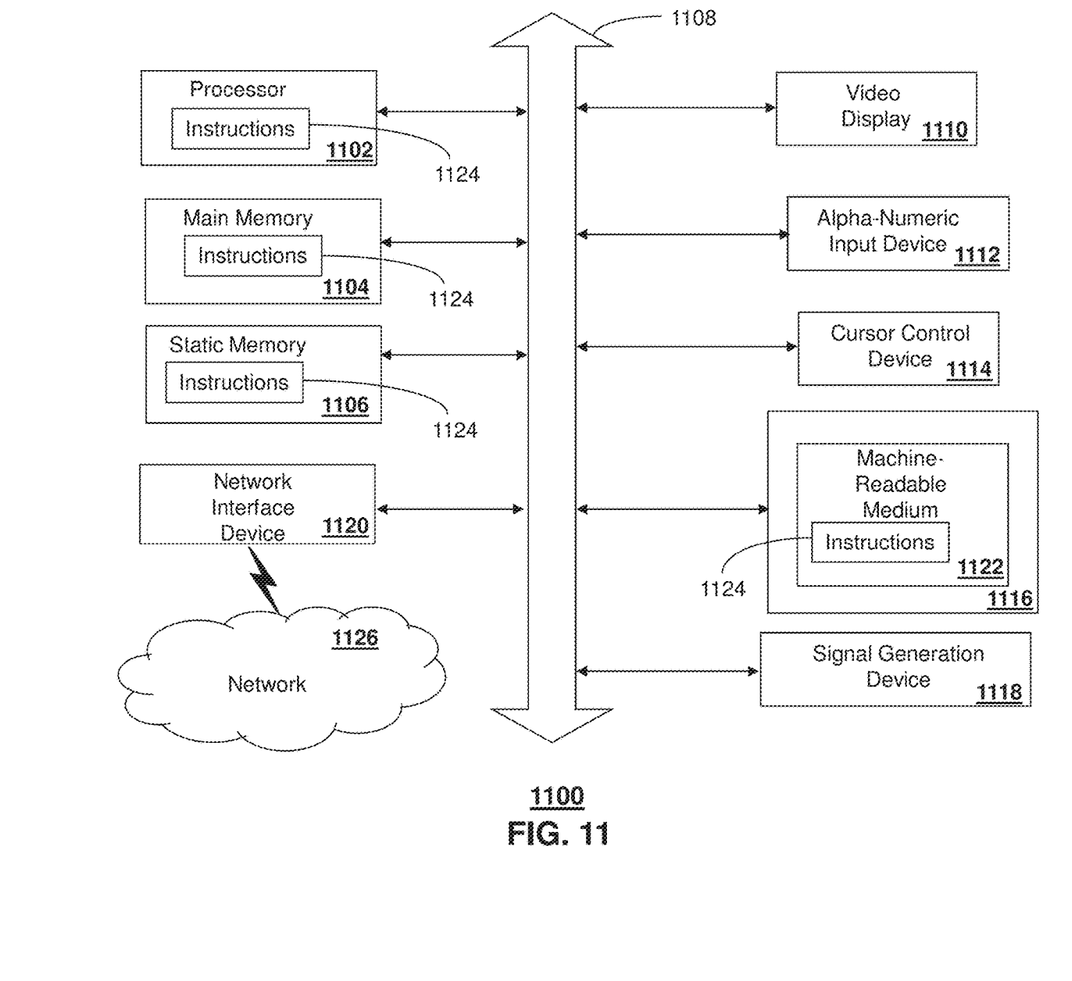
FIG. 11 depicts an illustrative diagrammatic representation of a machine in the form of a computer system within which a set of instructions, when executed, may cause the machine to perform any one or more of the methodologies disclosed herein.

FIG. 11 depicts an exemplary diagrammatic representation of a machine in the form of a computer system 1100 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, a solid state display, or a cathode ray tube (CRT)). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a machine-readable medium 1122 on which is stored one or more sets of instructions (e.g., software 1124) embodying any one or more of the methodologies or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus, comprising:
   a controller; and
   a memory that stores executable instructions that, when executed by the controller, facilitate performance of operations comprising:
      determining a user profile of a plurality of user profiles associated with a gaming accessory comprising a plurality of programmable layers; and
      identifying a substitute accessory stimulation for a gaming accessory stimulation of the gaming accessory by way of a predetermined association of the gaming accessory stimulation with the substitute accessory stimulation of a programmable layer of the plurality of programmable layers,
      wherein the predetermined association is recorded in the user profile of the plurality of user profiles, and wherein other predetermined associations of stimulations of the gaming accessory with other substitute accessory stimulations are recorded in other user profiles of the plurality of user profiles.

2. The apparatus of claim 1, wherein the gaming accessory corresponds to one of a keyboard, a gaming pad, a mouse, a gaming console controller, a joystick, a microphone, a headset with the microphone, and wherein the identifying of the user profile of the plurality of user profiles associated with the gaming accessory is based on identity information received from the gaming accessory.

3. The apparatus of claim 1, wherein the operations further comprise:
   accessing the predetermined association by way of an accessory management software application operating in a computing device or another computing system communicatively coupled to a gaming software application;
   determining identity information by way of one of the gaming accessory and the computing device to obtain an identified user account of a plurality of user accounts according to the identity information, wherein the plurality of user accounts are associated with the plurality of user profiles;
   retrieving the user profile from the plurality of user profiles to obtain a retrieved profile according to the identified user account; and
   retrieving the predetermined association from the retrieved profile.

4. The apparatus of claim 3, wherein the accessory management software application is operable to present in a graphical user interface a plurality of associable actions and a plurality of accessories, wherein an action from the plurality of associable actions comprises the substitute accessory stimulation, and wherein the accessory corresponds to the gaming accessory; receive a request to associate the action of the plurality of associable actions with an input function of the gaming accessory, wherein the input function when selected generates the gaming accessory stimulation; and transmit the predetermined association to the apparatus.

5. The apparatus of claim 1, wherein the operations further comprise recording the predetermined association of the substitute accessory stimulation with the gaming accessory stimulation in association with the user profile and a user account associated with the user profile.

6. The apparatus of claim 1, wherein the operations further comprise associating the user profile comprising the predetermined association with a gaming software application, and wherein the identifying of the user profile of the plurality of user profiles associated with the gaming accessory is based on a selection of the user profile responsive to a presentation of the plurality of user profiles.

7. The apparatus of claim 6, wherein the operations further comprise:
   detecting the gaming software application after establishing communications with a computing device;
   selecting the user profile comprising the predetermined association responsive to detecting the gaming software application; and
   retrieving the predetermined association from the user profile.

8. The apparatus of claim 1, wherein the apparatus corresponds to a dongle physically engaged with a port of a computing device communicatively coupled to a gaming software application, and wherein the substitute accessory stimulation is provided to the gaming software application in place of the gaming accessory stimulation, responsive to the identifying of the substitute accessory stimulation.

9. A non-transitory, machine-readable storage medium, comprising executable instructions that, when executed by a processor, facilitate performance of operations, comprising:

detecting a gaming accessory stimulation of a gaming accessory associated with a programmable layer of a plurality of programmable layers associated with the gaming accessory; and identifying a substitute accessory stimulation for the gaming accessory stimulation based on a predetermined association of the gaming accessory stimulation with the substitute accessory stimulation of the programmable layer of the plurality of programmable layers, wherein the predetermined association is recorded in a user profile of a plurality of user profiles associated with a user account, and wherein the substitute accessory stimulation is provided to a computing device, in response to the identifying of the substitute accessory stimulation of the programmable layer, to manage operations of a gaming software application communicatively coupled to the computing device.

10. The non-transitory, machine-readable storage medium of claim 9, further comprising:

determining identity information from one of the gaming accessory and the computing device;

identifying the user account based on the identity information;

retrieving the plurality of user profiles in response to the identifying of the user account; and retrieving the predetermined association from the user profile.

11. The non-transitory, machine-readable storage medium of claim 9, wherein the gaming software application is executed in the computing device, and wherein other predetermined associations of stimulations of the gaming accessory with other substitute accessory stimulations are recorded in other user profiles of the plurality of user profiles.

12. The non-transitory, machine-readable storage medium of claim 9, wherein the gaming software application is executed in a remote computer system that is communicatively coupled to the computing device.

13. The non-transitory, machine-readable storage medium of claim 9, wherein the gaming accessory corresponds to one of a keyboard, a gaming pad, a mouse, a gaming console controller, a joystick, a microphone, a headset comprising the microphone, and wherein the computing device corresponds to one of a computer system and a gaming console.

14. The non-transitory, machine-readable storage medium of claim 9, wherein the non-transitory, machine-readable storage medium operates in portable apparatus that is physically or wireless engaged to each of the gaming accessory and the computing device.

15. A method, comprising:

identifying, by a system comprising a processor, a substitute gaming accessory stimulation for a gaming accessory stimulation associated with a programmable layer of a plurality of programmable layers of a gaming accessory, wherein a user profile of a plurality of user profiles associates the substitute gaming accessory stimulation with the gaming accessory stimulation, and wherein the substitute gaming accessory stimulation is provided to a computing device to manage a gaming software application.

16. The method of claim 15, wherein the gaming accessory corresponds to one of a keyboard, a gaming pad, a mouse, a gaming console controller, a joystick, a microphone, a headset with the microphone, and wherein the computing device corresponds to one of a computer system and a gaming console.

17. The method of claim 15, comprising gathering, by the system, usage information of the gaming accessory by collecting stimulations generated therefrom.

18. The method of claim 17, comprising transmitting, by the system, the usage information to an accessory software management application to present statistical information associated with the usage information.

19. The method of claim 17, further comprising:

recording, by the system, in the user profile, an association of the gaming accessory stimulation with the substitute gaming accessory stimulation for the programmable layer of the plurality of programmable layers of the gaming accessory; and associating, by the system, the user profile with a user account associated with the user profile, wherein other predetermined associations of stimulations of the gaming accessory with other substitute accessory stimulations are recorded in other user profiles of the plurality of user profiles.

20. The method of claim 17, further comprising:

receiving, by the system, identity information from one of the gaming accessory and the computing device;

identifying, by the system, a user account based on the identity information;

retrieving, by the system, the user profile based on the user account associated with the user profile; and retrieving, by the system, a predetermined association of the substitute gaming accessory stimulation with the gaming accessory stimulation from the user profile.

* * * * *